Patented Sept. 12, 1922.

1,429,001

UNITED STATES PATENT OFFICE.

GERHARD NICOLAAS VIS, OF PARIS, FRANCE.

PROCESS FOR TRANSFORMING ALKALI-METAL MONOCHROMATES INTO BICHROMATES OR CHROMIC ACID.

No Drawing. Application filed July 10, 1919. Serial No. 309,933.

*To all whom it may concern:*

Be it known that I, GERHARD NICOLAAS VIS, of Paris, France, have invented a new and useful Process for Transforming Alkali-Metal Monochromates into Bichromates or Chromic Acid, which process is fully set forth in the following specification.

In my previous application dated 22nd January 1918, No. 213,206, it was shown that by the sole action of carbonic acid upon monochromates the greater portion of such salts can easily be transformed into bichromates with the simultaneous production of alkali-metal bicarbonates.

In the application dated the 18th December 1918, No. 267,349, it was shown that the base employed in the Solvay reaction for the manufacture of carbonate of soda is as applicable to alkali-metal monochromates as to sodium chloride. Together with the bicarbonate of soda there is formed ammonium chromate, this latter being decomposed by lime and the calcium chromate thus obtained is transformed into calcium sulphate and alkali-metal bichromate by double decomposition with alkali-metal bisulphates.

This invention relates to a modification of or improvement in the processes of said applications and has for its object a process which obviates the use of ammonia while employing alkali-metal bisulphates, the same final result being obtained.

According to this invention the whole or part of the monochromate is transformed into alkali-metal bicarbonate and bichromate with the aid of carbonic acid; all the chromic acid present in form of bichromate of sodium being then precipitated as chromate of calcium with the aid of hydrate of calcium, the calcium chromate thus obtained being transformed into alkali-metal bichromate and calcium sulphate by the addition of alkali-metal bisulphates.

The process is carried out in the following manner:

Into a solution of sodium monochromate containing more than 40 parts of such salt to 100 parts of solution (a solution saturated at 45° C. for example) is passed a current of carbonic acid (which may be pure or mixed with inert gases) the temperature being maintained at 30° C. The carbonic acid is caused to act until saturation takes place or until, for example, about one half of the sodium monochromate is transformed into sodium bichromate and sodium bicarbonate. The duration of the operation may be greatly hastened by not pushing the reaction so far as to obtain the maximum yield of the substance.

The liquid now containing a nearly equimolecular mixture of sodium mono and bichromate is separated from the sodium bicarbonate by known means and the latter salt is subjected to systematic washing. The filtered liquid to which the first wash waters are added is heated to boiling during which a certain quantity of carbonic acid is evolved; when this evolution has finished there is added as much burnt lime in the form of a paste as there is free chromic acid present in the form of sodium bichromate. If, for example, the process is started with 2000 kgs. of a solution of sodium chromate saturated at 45° C., there is obtained after separation and washing of the sodium bicorbonate 2300 kgs. of a solution composed in round numbers of 500 kgs. of sodium monochromate, 400 kgs. of sodium bichromate and 1400 kgs. of water.

This solution is brought to boiling point and when the evolution of carbonic acid has ceased there is added while maintaining the temperature at boiling point 90 kgs. of burnt lime slaked with three times its weight of water. About 230 kgs. of anhydrous calcium chromate separates in the form of a heavy sandy product which is very easy to wash as the calcium chromate is nearly insoluble in the hot solution of sodium monochromate. After washing with boiling water, the product thus obtained is dried in a centrifugal hydroextractor and while still wet is mixed with its weight of water and the paste obtained is introduced into a solution consisting of 180 kgs. of sodium bisulphate and 350 kgs. of water previously heated to 60° C. The double decomposition is facilitated by brisk agitation for several hours, the temperature being maintained at 70° C. The solution of sodium bichromate is then separated from the calcium sulphate and the latter washed until it becomes white. The filtrate and wash waters are concentrated, the small quantity of calcium sulphate which has passed into solution gradually separating as the water evaporates; when the specific gravity reaches 1.4 the calcium sulphate becomes absolutely insoluble and with more complete concentration 220 kgs. of so-called molten sodium bichromate are obtained.

The filtrate and the wash waters of the calcium chromate containing about 0.4 parts of calcium chromate for every 100 parts of water and also in round numbers 750 kgs. of sodium chromate are treated at boiling point with sodium carbonate in order to precipitate the lime present or with the same object with the carbonic acid after cooling.

The solution of sodium monochromate freed from its lime is concentrated to a suitable degree; again treated with carbonic acid and then again subjected to the operations above described.

By adding to the calcium chromate a bisulphate more acid $NaHSO_4$, sodium bichromates are obtained which contain free chromic acid in the quantity required; by proceeding in the manner as before but replacing the bisulphate with sulphuric acid commercially pure chromic acid is obtained.

One of the primary advantages of the process as above described resides in recuperation of sodium bicarbonate whereby the soda used in treating the chrome ore may be repeatedly used in furnacing the ore.

While sodium acid sulfate is specifically mentioned in the claims for converting calcium chromate into sodium bichromate, it is to be understood that sulfuric acid may replace the acid sulfate in part or in whole, depending on the content of chrome acid required in the bichromate, and its use is to be included within the scope of the invention.

Claims:

1. The process of manufacturing alkali metal bichromate from alkali metal monochromate in solution containing calcium, which consists in precipitating the calcium in said solution at boiling temperature by means of an alkali metal carbonate, subjecting the lime freed solution to the action of carbonic acid, separating the alkali metal bicarbonate from the resulting solution containing alkali metal bichromate, treating the latter solution with slaked lime thereby precipitating calcium chromate, and treating said calcium chromate precipitate with alkali metal bisulfate to produce alkali metal bichromate.

2. The method consisting in subjecting a solution of alkali metal monochromate to the action of carbonic acid, separating the alkali metal bicarbonate formed from the resulting solution containing alkali-metal bichromate, treating the latter solution with slaked lime to form calcium chromate and solution of alkali-metal monochromate, and treating said calcium chromate with alkali-metal bisulfate to produce alkali-metal bichromate.

3. The method consisting in subjecting a concentrated solution of sodium monochromate to the action of carbonic acid, separating the sodium bicarbonate precipitate from the resulting sodium bichromate solution, heating the latter to boiling, adding slaked lime to produce calcium chromate and sodium monochromate, separating the calcium chromate, and reacting the same with sodium acid sulfate to form sodium bichromate.

In testimony whereof I have signed this specification.

GERHARD NICOLAAS VIS.